United States Patent [19]

Morishita

[11] 4,215,979
[45] Aug. 5, 1980

[54] IGNITION TORCH

[75] Inventor: Teru Morishita, Shizuoka, Japan

[73] Assignee: Toyota Jidosha Kogyo Kabushiki Kaisha, Toyota, Japan

[21] Appl. No.: 923,587

[22] Filed: Jul. 11, 1978

[30] Foreign Application Priority Data

Mar. 1, 1978 [JP] Japan .................................. 53-23801

[51] Int. Cl.² .............................................. F02C 7/26
[52] U.S. Cl. .............................. 431/264; 60/39.82 P; 60/39.82 S; 431/263
[58] Field of Search .................... 60/39.82 P, 39.82 R, 60/39.82 S; 431/263, 264, 266

[56] References Cited

U.S. PATENT DOCUMENTS

| 799,856 | 9/1905 | Lemale | 60/39.82 P |
|---|---|---|---|
| 2,843,197 | 7/1958 | Snyder | 431/263 |
| 3,090,200 | 5/1963 | Barberis | 431/263 X |
| 3,265,114 | 8/1966 | Childree | 60/39.82 R |
| 3,750,392 | 8/1973 | Zoll | 60/39.82 P |
| 4,121,419 | 10/1978 | Kuznetsov et al. | 60/39.82 P |

FOREIGN PATENT DOCUMENTS 765175 1/1957 United Kingdom ................ 60/39.82 S

*Primary Examiner*—Carlton R. Croyle
*Assistant Examiner*—Edward Look
*Attorney, Agent, or Firm*—Stevens, Davis, Miller & Mosher

[57] ABSTRACT

An ignition torch for a gas turbine comprising a cylindrical body which is closed at one end and open at another end. Fuel and air are separately fed into the cylindrical body and mixed with each other therein by an appropriate means to give a uniform fuel-air mixture near the open end of the cylindrical body. The mixture is electrically ignited to continuously emit a stable torch flame.

4 Claims, 3 Drawing Figures

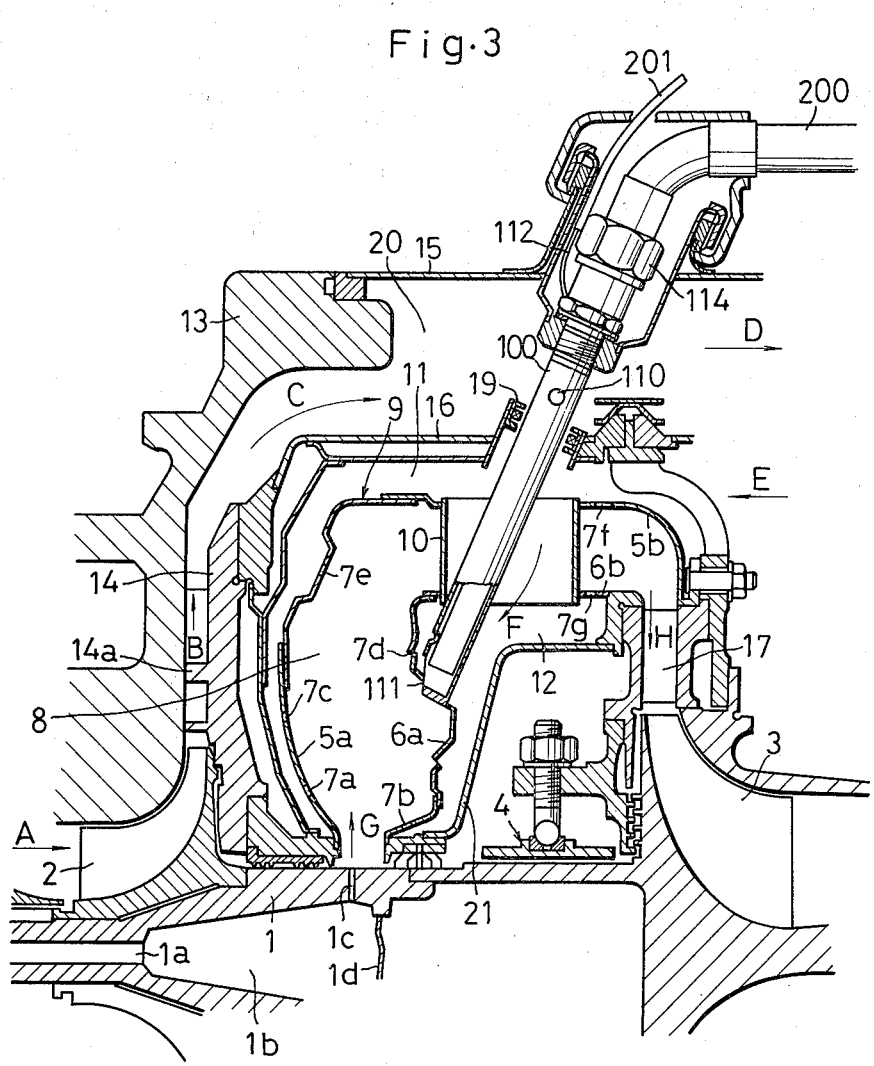

IGNITION TORCH

The present invention relates to an improved ignition torch for a gas turbine.

In general, an electrical sparking plug is well known in the art as an ignition device for a gas turbine. However, such a sparking plug emits sparks only intermittently, and is low in ignition energy. Further, especially in case of hot starting, the insulating capacity of an insulator provided in the forward end of the sparking plug tends to become lower since the forward end of the plug faces the interior of a combustor in the gas turbine, causing no production of sparks. Thus, the sparking plug does not always work well. Moreover, the mounting position of the sparking plug in the gas turbine is not freely variable.

It is an object of the present invention to provide an improved ignition torch which provides high ignition energy and a stable ignition capacity in comparison with a conventional sparking plug.

It is another object of the present invention to provide an improved ignition torch which can continuously provide an excellent ignition capacity over a long period of time.

It is still another object of the present invention to provide an improved ignition torch which can produce a flame of which the shape, size and direction can be optionally determined.

The invention will now be described in further detail by way of example with reference to the accompanying drawings, in which:

FIG. 3 is a longitudinal cross-sectional view of a gas turbine in which the ignition torch of FIG. 1 is applied.

Figure 1:
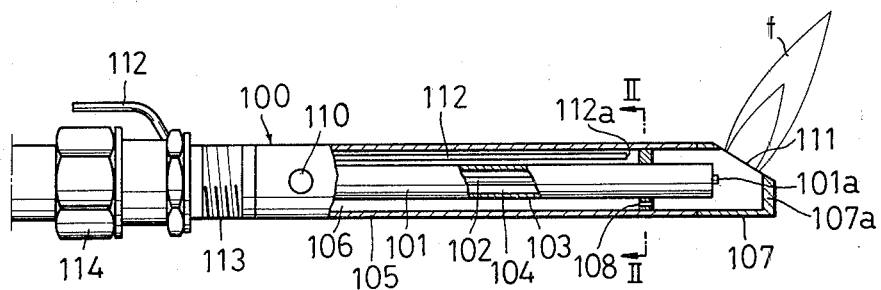
FIG. 1 is a partially fragmentary front elevational view of the ignition torch provided by the present invention.
Figure 2:
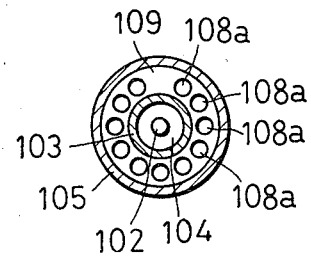
FIG. 2 is an enlarged cross-sectional view taken along the lines II—II in FIG. 1.

Referring now to FIGS. 1 and 2 of the drawings, there is shown an ignition torch 100 comprising a cylindrical body 105 which is closed at its rear end as shown on the left-hand side of FIG. 1, an electrode assembly 101 coaxially provided in the body 105, an annular partition wall 108 provided in the body 105 adjacent to its front end, an ignition fuel pipe 112 arranged in the body 105 and an air intake port 110 provided through the peripheral wall of the body 105 adjacent to its rear end.

The cylindrical body 105 is provided at its front end with a generally cylindrical cap 107 which is generally coaxial with the body 105. The cap 107 is partly closed by a generally semi-circular end plate 107a. The cap 107 is partly cut away at its front end contiguous to the end plate 107a to define a beveled opening 111 which serves as an outlet for the torch 100. The partition wall 108 is located somewhat inwardly of the opening 111, and the electrode assembly 101 passes through the center of the partition wall 108.

The electrode assembly 101 comprises a linear central electrode 102, a cylindrical earth electrode 103 encircling the central electrode 102 and an insulator 104 provided between the two electrodes 102 and 103. The electrode assembly 101 has a tip 101a confronted with the opening 111 for spark ignition. The cylindrical body 105 and the electrode assembly 101 define an annular air duct 106 therebetween, through which the ignition fuel pipe 112 extends along the axis of the body 105.

The partition wall 108 is provided with a plurality of small air vents 108a in a circular array around the electrode assembly 101, and a nozzle 112a provided in the forward end of the ignition fuel pipe 112 is opposite to a blind portion 109 of the partition wall 108 which is devoid of any such air vent 108a.

The ignition torch 100 is further provided with a set screw 113 and another set screw 114 for securing a cord 200 (FIG. 3) to the torch 100.

Pressurized gaseous fuel such as propane or butane gas is introduced into the ignition fuel pipe 112 and injected through the nozzle 112a against the blind portion 109 of the wall 108 to be spread around while air is introduced through the air intake 110 into the air duct 106. Consequently, fuel and air blow out through the air vents 108a generating a turbulence before the partition wall 108 and are rapidly mixed with each other by the turbulence to produce a combustible mixture.

The combustible mixture is easily ignited by a spark from the tip 101a of the electrode assembly 101, and emits a flame f through the opening 111. The size, shape and direction of the flame f can be optionally determined by modifying the shape of the opening 111. Since the flame f has a high ignition energy, the ignition torch 100 works stably and reliably in the combustor of a gas turbine or the like.

FIG. 3 shows a radial-flow gas turbine in which the ignition torch 100 is applied. The gas turbine has a rotating shaft 1 secured to a compressor rotor 2 and a turbine rotor 3 in its front and rear portions respectively, and the shaft 1 is rotatably supported by an air bearing 4 and another bearing (not shown). Behind the compressor rotor 2, a diffuser 14 having a plurality of vanes 14a is mounted on a front housing 13. The diffuser 14 is also connected with an inner housing 16.

The front housing 13 is fixed to an outer housing 15, and an annular air passage 20 is formed between the outer and inner housings 15 and 16. Within the inner housing 16, there is arranged an annular combustor 9 formed by casings 5a, 5b, 6a and 6b, providing an annular combustion chamber 8 therein. In the casings 5b and 6b, there are provided a plurality of breather pipes 10 crossing the combustion chamber 8 to communicate a pair of annular air chambers 11 and 12 with each other. The first air chamber 11 is formed between the inner housing 16 and the casings 5a and 5b while the second air chamber 12 is formed between a bearing housing 21 and the casings 6a and 6b. The casings 5a, 5b, 6a and 6b are provided with air holes 7a, 7b, 7c, 7d, 7e, 7f and 7g. The rotating shaft 1 is provided with a longitudinally extending fuel passage 1a which communicates with a hole 1b having an end plate 1d. A plurality of fuel injection ports 1c are provided in the rotating shaft 1 facing the combustion chamber 8.

The ignition torch 100 is fixed to the outer housing 15 and extends through the breather pipes 10 so that its outlet opening 111 faces the combustion chamber 8. A sealing means 19 is provided between the ignition torch 100 and the inner housing 16, and the air intake port 110 in the ignition torch 100 communicates with the air passage 20. The ignition torch 100 is connected through the cord 200 to an ignitor (not shown) while the ignition fuel pipe 112 is connected through another fuel pipe 201 to a fuel tank (not shown).

Upon rotation of the compressor rotor 2, air is introduced into the compressor as indicated by an arrow A, increased in speed and fed into the diffuser 14 as indicated by an arrow B. The air which leaves the diffuser 14 at reduced speed and high pressure enters the air passage 20 as indicated by an arrow C, and is introduced into a heat exchanger (not shown) as indicated by an arrow D to be heated therein. Then the heated air successively enters the first air chamber 11, the breather pipes 10 and the second air chamber 12 as indicated by arrows E and F. The air entering the air chambers 11 and 12 is introduced through the air holes 7a–7g into the combustion chamber 8.

Fuel is introduced through the front end of the rotating shaft 1 and fed through the fuel passage 1a into the hole 1b. The fuel flows membraneously along the wall surface of the hole 1b by centrifugal force upon rotation of the shaft 1 and is injected also by centrifugal force through the injection ports 1c into the combustion chamber 8 as indicated by an arrow G to be atomized and mixed with the air therein.

The mixture of the fuel and the air thus compounded in the combustion chamber 8 is easily and steadily ignited by the flame f emitted from the ignition torch 100, and keeps continuous combustion in the combustion chamber 8. Combustion gas generated in the combustion chamber 8 is mixed with air entering the combustion chamber 8 through the air holes 7f and 7g to be lowered in temperature at a certain degree. Then the combustion gas is introduced into the turbine nozzle 17 as indicated by an arrow H, and blows out against the turbine rotor 3 to rotate the same.

The air in the air passage 20 is higher in pressure than that in the air chambers 11 and 12, and the pressure difference is substantially equal to the pressure loss of the air in the heat exchanger, i.e., around 2-5% of the pressure of the air in the air passage 20. Therefore, the air is continuously introduced into the air duct 106 of the ignition torch 100 through the air intake port 110 communicating with the air passage 20. In consequence, when fuel is fed through the fuel pipe 201 into the ignition fuel pipe 112, the ignition torch 100 produces a flame f through the opening 111 into the combustion chamber 8, as hereinabove described.

Since the flame f has a high ignition energy, the ignition torch 100 gives a good ignition capacity.

In the ignition torch 100 of the present invention, only a part of the cap 107 faces the interior of the combustion chamber 8, and the other portions including the electrode assembly 101 are not exposed to the high temperature gas in the combustion chamber 8. Further, the ignition torch 100 is excellent in durability since it is always cooled by cold air continuously introduced through the air intake port 110.

The ignition torch 100 of the present invention may alternatively be mounted in the gas turbine in any other desired position, so that the size, shape and direction of the flame f can be optionally determined by modifying the shape of the opening 111.

While the invention has been described with reference to a preferred embodiment thereof, it is to be understood that modifications or variations may be easily made without departing from the scope of this invention which is defined by the appended claims.

What is claimed is:

1. An ignition torch comprising:
    an elongated cylindrical body closed at one end and having an opening at its other end;
    an electrode assembly in said cylindrical body, said assembly comprising:
        a cylindrical ground electrode coaxial with the body, the exterior surface of said ground electrode and the interior surface of the body defining an annular duct therebetween;
        a linear central electrode extending along the longitudianl axis of the body within said ground electrode and terminating in a spark ignition tip adjacent said opening; and
        an insulator between said electrodes;
    a through hole defined in said body through which air is fed into said duct, said hole being remote from said opening;
    a fuel and air mixing partition wall extending across said air duct adjacent said opening with the ignition tip being between the wall and the opening, said wall having a central circular opening therein through which the electrode assembly extends, a plurality of air holes therethrough arranged in an array around said electrode assembly, and an imperforate blind portion; and
    a fuel feed pipe in said annular duct, said pipe terminating in an open injection outlet end spaced a short distance from and facing said blind portion of the wall on the side thereof remote from the tip, said fuel feed pipe extending into said body through the closed end thereof.

2. The invention as defined in claim 1 wherein said opening has a central axis inclined at an angle to the central axis of said cylindrical body.

3. The invention as defined in claim 2 wherein said forward end of said cylindrical body is provided with an end plate which partly closes said forward end of said cylindrical body, a portion of said forward end of said cylindrical body being recessed from the remaining portion thereof to define said opening in a plane lying at an angle to a plane in which said end plate resides.

4. An ignition torch comprising:
    an elongated cylindrical body closed at one end and having an opening at its other end;
    an electrode assembly in said body, said electrode assembly comprising:
        a cylindrical ground electrode coaxial with the body, the exterior surface of said ground electrode and the interior surface of said body defining an annular duct therebetween;
        a linear central electrode extending along the longitudinal axis of the body within said ground electrode and terminating in a spark ignition tip adjacent said opening; and
        an insulator between said electrodes;
    a through hole defined in said body through which air is fed into said duct, said hole being remote from said opening;
    a ring-shaped fuel and air mixing partition extending across said duct adjacent said opening with the ignition tip being between the wall and the opening, said wall having a central opening therein through which the electrode assembly extends, and a plurality of circumferentially spaced air holes therethrough arranged in a substantially circular array around the electrode assembly, said air holes being disposed almost completely circumferentially around the partition except at an imperforate blind section thereof of small circumferential extend; and
    a fuel feed pipe in said annular duct between said closed end of the body and said partition wall, said pipe terminating in an open injection outlet end spaced a short distance from and facing said blind section of the wall.

* * * * *